(12) United States Patent
Cimecioglu et al.

(10) Patent No.: US 6,265,570 B1
(45) Date of Patent: Jul. 24, 2001

(54) COLD WATER SOLUBLE STARCH ALDEHYDES AND THE METHOD OF PREPARATION THEREOF

(75) Inventors: A. Levent Cimecioglu, Princeton, NJ (US); Bjork Ohlhorst, Lucerne (CH); Daniel B. Solarek, Belle Mead, NJ (US); Douglas J. Slate, Augusta, NJ (US); James L. Eden, E. Millstone, NJ (US)

(73) Assignee: National Starch & Chemical Investment Holding Corporation

( * ) Notice: Subject to any disclaimer, the term of this patent is extended or adjusted under 35 U.S.C. 154(b) by 0 days.

(21) Appl. No.: 09/186,503

(22) Filed: Nov. 5, 1998

(51) Int. Cl.[7] ................................... C08B 31/08
(52) U.S. Cl. ............................. 536/104; 536/43; 536/44; 536/45; 536/50; 536/52; 536/84; 536/102; 536/111; 536/114
(58) Field of Search .................... 536/43, 44, 45, 536/50, 52, 84, 111, 114, 102, 104

(56) References Cited

U.S. PATENT DOCUMENTS

| | | | |
|---|---|---|---|
| 3,062,652 | 11/1962 | Jeffreys et al. | 96/99 |
| 3,086,969 | 4/1963 | Slager | 260/209 |
| 3,269,964 | 8/1966 | Curtis | 260/17.3 |
| 3,299,052 | 1/1967 | Curtis | 260/233.3 |
| 3,519,618 | 7/1970 | Parmerter | 260/233.3 |
| 3,553,193 | 1/1971 | LeRoy et al. | 260/233.3 |
| 3,632,802 | 1/1972 | BeMiller et al. | 260/233.3 R |
| 3,740,391 | 6/1973 | Williams et al. | 260/233.3 R |
| 4,508,594 | 4/1985 | Jansma et al. | 162/135 |
| 4,605,718 | 8/1986 | Jansma et al. | 526/240 |
| 4,663,448 * | 5/1987 | Chiu | 536/111 |
| 4,675,394 * | 6/1987 | Solarek et al. | 536/43 |
| 4,839,449 * | 6/1989 | Billmers et al. | 526/238.2 |
| 5,011,918 * | 4/1991 | Billmers et al. | 536/18.7 |
| 5,318,635 * | 6/1994 | Kasica et al. | 127/69 |
| 5,320,711 | 6/1994 | Dauplaise et al. | 162/168.2 |
| 5,767,057 * | 6/1998 | Merz et al. | 510/452 |
| 5,948,747 * | 9/1999 | Schambil et al. | 510/443 |

* cited by examiner

*Primary Examiner*—Gary Geist
*Assistant Examiner*—Howard V. Owens, Jr.
(74) *Attorney, Agent, or Firm*—Laurelee Duncan; Eugene Zagarella

(57) ABSTRACT

Stable, cold water soluble, ready for use starch aldehyde compositions and the method of preparation of such compositions wherein an aqueous dispersion of a converted starch acetal is hydrolyzed under acidic conditions to form the starch aldehyde which is then spray dried into a cold water soluble starch aldehyde powder.

18 Claims, No Drawings

COLD WATER SOLUBLE STARCH ALDEHYDES AND THE METHOD OF PREPARATION THEREOF

BACKGROUND OF THE INVENTION

This invention relates to stable, cold water soluble, ready for use starch aldehyde compositions, their method of preparation and the use thereof as strength additives in papermaking.

The term "paper", as used herein, includes sheet-like masses and molded products made from fibrous cellulosic material which may be derived from natural sources, synthetics such as polyamides, polyesters, rayon and polyacrylic resins as well as from mineral fibers such as asbestos and glass. In addition, paper made from combinations of cellulosic and synthetic materials are applicable herein. Paperboard is also included within the broad term "paper".

The preparation of aldehyde containing starches and other polymers and the use of such aldehyde derivatives as wet and dry strength additives in the paper industry is well known. Oxidative and non-oxidative methods have been used to introduce aldehyde groups into polysaccharides such as starch. The oxidative methods have included: a) treatment of starch with alkali metal bromite or hydrobromite under carefully controlled conditions as disclosed in U.S. Pat. No. 3,553,193 issued Jan. 5, 1971 to D. H. LeRoy et al.; b) oxidizing a carbohydrate with an alkali metal ferrate as shown in U.S. Pat. No. 3,632,802 issued Jan. 4, 1972 to J. N. BeMiller; c) enzymatically oxidizing hydroxypropyl galactoglycoside starch ethers or ethyl galactoglycoside starch ethers with galactose oxidase as disclosed in U.S. Pat. No. 4,663,448 issued May 5, 1987 to C. W. Chiu; and, d) treatment with periodic acid or as disclosed in U.S. Pat. No. 3,086,969 issued to J. E. Slager on Apr. 23, 1963 which shows the preparation of dialdehyde polysaccharide using periodic acid and U.S. Pat. No. 3,062,652 issued on Nov. 6, 1962 to R. A. Jeffreys et al. which shows the preparation of dialdehyde gums using periodate or periodic acid.

Non-oxidative methods for preparing aldehyde containing starches include a) the reaction of granular starch with an unsaturated aldehyde as disclosed in U.S. Pat. No. 3,519,618 issued Jul. 7, 1970 to S. Parmerter, and b) the reaction of an amidated starch or glucopyranosyl compound with glyoxal as shown in U.S. Pat. No. 3,740,391 issued Jun. 19, 1973 to L. Williams et al.

Aldehyde containing polymers used as strength additives in paper are disclosed in U.S. Pat. Nos. 4,508,594 and 4,605,718 issued on Apr. 2, 1986 and Aug. 12, 1986 respectively to R. Jansma et al. which show aldehyde containing vinyl polymers. Glyoxalated (meth)acrlyamide polymers are disclosed in U.S. Pat. No. 5,320,711 issued to D. Dauplaise et al. on Jun. 14, 1994.

U.S. Pat. No. 3,269,964 issued to J. Curtis on Aug. 30, 1966 discloses a water dispersible composition which is the reaction product of a dialdehyde polysaccharide and a condensation product of dicyandiamide and formaldehyde. U.S. Pat. No. 3,299,052 issued to J. Curtis on Jan. 17, 1967 also discloses a water dispersible composition which is the reaction product between a dialdehyde polysaccharide and a hypochlorite oxidized polysaccharide.

Many of the wet strength additives currently used in the paper industry are synthetic polymers which are aqueous, ready-for-use liquids. However, they generally have limited storage stability and shelf life.

One of the problems associated with the use of aldehyde containing derivatives is the possibility of crosslinking and instability that they possess.

U.S. Pat. No. 4,675,394 issued to D. Solarek et al. on Jun. 23, 1987, discloses aldehyde containing starch derivatives, their preparation from acetals and their use as paper additives. As disclosed in the patent, problems associated with the use of aldehyde derivatives in active form can be avoided by providing the stable acetal form of the corresponding starch which can be converted to the starch aldehyde by cooking under acid conditions just prior to its use. However, this involves an extra conversion step which must be carried out by the user-customer.

What is desired is a ready for use starch aldehyde product which is stable and avoids the need to combine it with other components or the necessity of performing an extra processing step prior to its use in papermaking or other application.

SUMMARY OF THE INVENTION

Now it has been found that a cold water soluble, ready for use starch aldehyde composition is provided by the process wherein an aqueous dispersion of a fluidity or converted starch aldehyde is formed and then spray dried into a cold water soluble powder.

More particularly, this invention involves a process for the preparation of a cold water soluble, ready for use starch aldehyde composition comprising:

a) forming a converted cationic starch acetal having a water fluidity of from about 30 to 85 and the structure selected from the group consisting of

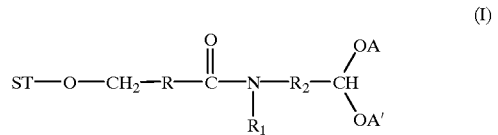

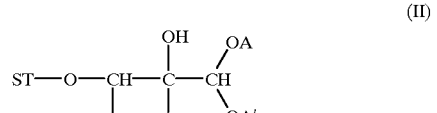

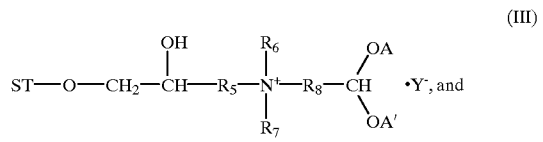

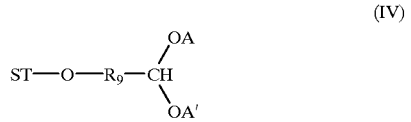

wherein ST is cationic starch; R is $(CH_2)_n$ or a divalent aromatic group wherein n is 0 to 22; $R_1$, $R_6$ and $R_7$ are independently selected from the group consisting of hydrogen and a $C_1$ to $C_{22}$ alkyl, aryl, aralkyl or alkaryl group; $R_2$, $R_5$ and $R_8$ are independently $(CH_2)_m$ where m is from 1 to 6; $R_3$ and $R_4$ are independently hydrogen or an alkyl group having 1 to 6 carbon atoms; $R_9$ is a divalent organic group containing no starch-reactive substituents, Y is an anion such as a halide, sulfate or nitrate; and A and A' independently are an alkyl group of 1 to 6 carbon atoms or together form at least a 5-membered cyclic acetal;

b) cooking the acetal containing starch under acidic conditions to hydrolyze and form a dispersion of the starch aldehyde; and c) spray drying the resulting aldehyde at a pH of from about 4 to 7 to form a cold water soluble starch aldehyde powder.

DETAILED DESCRIPTION OF THE INVENTION

This invention involves stable, cold water soluble starch aldehyde compositions and the method of preparation of such compositions. The starch aldehyde is prepared by first providing a converted starch acetal which is hydrolyzed under acid conditions to form the starch aldehyde which is then spray dried into a cold water soluble starch aldehyde powder.

The starch aldehyde has a structure selected from the group consisting of:

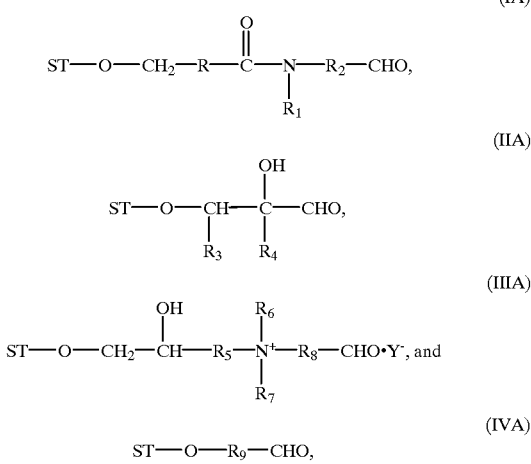

wherein ST is starch or modified starch; R is $(CH_2)_n$ or a divalent aromatic group wherein n is 0 to 22; $R_1$, $R_6$ and $R_7$ are independently selected from the group consisting of hydrogen and a $C_1$ to $C_{22}$ alkyl, aryl, aralkyl or alkaryl group; $R_2$, $R_5$ and $R_8$ are independently $(CH_2)_m$ where m is from 1 to 6; $R_3$ and $R_4$ are independently hydrogen or an alkyl group having 1 to 6 carbon atoms; $R_9$ is a divalent organic group containing no starch-reactive substituents and Y is an anion such as a halide, sulfate or nitrate.

Preferably in the above aldehyde structures, n is 0 to 11 and more preferably 0 to 5; $R_1$, $R_6$ and $R_7$ are methyl; and m is 1 to 2. The starch may be modified with cationic, anionic, amphoteric, zwitterionic, hydrophobic and nonionic groups and combinations of such groups. It is preferred that the starch is modified with a cationic group. Cationization of the starch can be produced by well known chemical reactions with reagents such as amino, imino, ammonium, sulfonium or phosphonium groups as disclosed, for example, in "Cationic Starches" by D. B. Solarek, in *Modified Starches: Properties and Uses,* Chapter 8, 1986 and in U.S. Pat. No. 4,119,487 issued Oct. 10, 1978 to M. Tessler. Such cationic derivatives include those containing nitrogen containing groups comprising primary, secondary, tertiary and quaternary amines and sulfonium and phosphonium groups attached through either ether or ester linkages. Particularly useful cationic derivatives are those containing amino or nitrogen groups having alkyl, aryl, alkaryl, aralkyl or cyclic substituents of up to 18 carbon atoms and especially 1 to 6 carbon atoms. Preferred derivatives are those containing the tertiary amino and quaternary ammonium ether groups.

The general method for preparing starches containing tertiary amino groups is described in U.S. Pat. No. 2,813,093 issued Nov. 12, 1957 to C. Caldwell et al. and also in U.S. Pat. No. 4,675,394 issued Jan. 23, 1987 to D. Solarek et al. The addition of quaternary ammonium groups to the starch is described in the previously noted '093 and '487 patents. The preparation of cationic sulfonium derivatives is described in U.S. Pat. No. 2,989,520 issued June 1991 to M. Rutenberg et al. and the preparation of cationic phosphonium dervivatives is disclosed in U.S. Pat. No. 3,077,469 issued Feb. 12, 1963 to A. Aszalos. The above noted patents, i.e., '487, '093, '394, '520 and '469 are all incorporated herein by reference.

The introduction of the cationic and other derivatizing groups may be prior to or subsequent to the reaction with the acetal derivatizing reagent as described herein or the introduction may be simultaneous with the acetal reagent and other derivatizing reagents. The amount of cationic group can be varied and generally a DS (degree of substitution) of from about 0.005 to 0.25 and preferably from about 0.01 to 0.06 will be used. The term "degree of substitution" as used herein indicates the average number of sites per anhydroglucose unit of the starch molecule on which there are substituent groups.

The base starch material used herein may be derived from any plant source including corn, potato, sweet potato, wheat, rice, tapioca, waxy maize, sago, sorghum and high amylose starch such as high amylose corn, i.e., starch having at least 45% by weight of amylose content. Starch flours may also be used as starch source.

The starch used in preparing the cold water soluble powders must be a fluidity or converted starch having a water fluidity (WF) of from about 30 to 85 and preferably about 50 to 65. The measurement for water fluidity as described herein is made using a Thomas Rotational Shear Type Viscometer (manufactured by Arthur H. Thomas Co., Philadelphia, Pa.) in accordance with standard procedures as disclosed in Zwiercan et al., U.S. Pat. No. 4,499,116 issued Feb. 12, 1985 which patent is incorporated by reference herein. The conversion of starch for use in this invention may be accomplished by known techniques such as acid hydrolysis, oxidation or enzyme conversion. Acid hydrolysis typically involves treatment of heated granular starch with mineral acid such as hydrochloric or sulfuric acid. Oxidation involves treatment of starch with an oxidizing agent such as sodium hypochlorite or using hydrogen peroxide and a catalytic amount of manganese salt as disclosed in U.S. Pat. No. 4,838,944 issued Jun. 13, 1998 to L. Kruger. Enzyme conversion involves treatment of granular starch slurried in water using an enzyme, e.g., alpha amylase enzyme at pH of about 5.6 to 5.7. A further description of known starch conversion processes may be found in "Converted Starches" by O. B. Wurzburg, *Modified Starches,* Chapter 2, pp. 17–40, 1986.

The starch aldehydes of this invention are prepared non-oxidatively by initially forming the converted starch acetals and then hydrolyzing them under acidic conditions. The starch acetals are prepared by reacting a modified or unmodified starch at a pH of about 9 or above with an acetal reagent which does not substantially crosslink or oxidize the starch during reaction. It is important that the starch acetal contain a limited defined amount of acetal content and this generally is a DS of from about 0.005 to 0.25 and preferably from about 0.01 to 0.06. The method of preparing the acetals is further described in U.S. Pat. No. 4,675,394 issued Jun. 23, 1987 to D. Solarek et al., which patent is incorporated herein by reference. It is understood that any means of adjusting the pH of the aqueous solution may be employed to attain the desired pH.

The acetal reagent has the general structure:

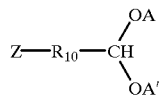

wherein Z is an organic group capable of reacting with the starch molecule to form an ether derivative and is selected from the group consisting of an epoxide, a halohydrin, an ethylenically unsaturated group and a halogen; and $R_{10}$ is a divalent organic group containing no reactive substituents. Typical acetal reagents have the formula:

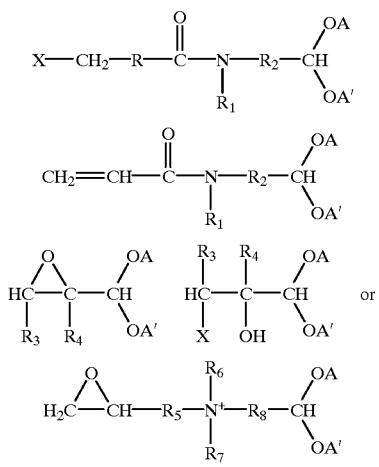

where R, $R_1$ to $R_8$ and A and A' are defined as above and X is selected from the group consisting of chlorine, bromine and iodine. In the halohydrin reagent the halogen and hydroxyl groups may be interchanged.

The starch aldehydes are prepared from the starch acetals by simultaneously cooking and hydrolyzing under acidic conditions at a pH of from about 1 to 6 and preferably about 2 to 3. This may be done using batch or jet cooking procedures. It is understood that any means of adjusting pH of the aqueous solution may be employed. The solids content will depend on the starch fluidity (WF) and acetal content (DS) and generally will vary from about 1 to 30% and more particularly from about 5 to 20% by weight. It is understood that upon hydrolysis, the aldehyde content generated is equal in degree of substitution (DS) to the initial acetal DS on starch. The aldehyde content or DS will therefore be from about 0.005 to 0.25 and preferably from about 0.01 to 0.06. U.S. Pat. No. 4,675,394 discloses the method of making starch aldehydes from starch acetals and also describes the acetal reagents and such patent is hereby incorporated by reference for such descriptions and methods.

The starch aldehyde cook or dispersion derived from the starch acetals, as described herein, are subsequently spray-dried after adjusting the pH to from about 4 to 7 to convert the starch aldehyde cook into a stable, ready for use, cold water soluble powder. Various methods of spray-drying are known and may be used in this invention. Some spray-drying methods are disclosed and described in U.S. Pat. No. 5,318,635 issued to J. Kasica et al. in Jun. 7, 1994.

One particularly useful spray-drying method is the continuous coupled jet-cooking/spray-drying process of the type disclosed in U.S. Pat. No. 5,131,953 issued Jul. 21, 1992 to J. Kasica et al. and hereby incorporated by reference. This process comprises the steps of:

a) forming a slurry or a paste comprising the converted starch and water;

b) jet-cooking the aqueous slurry or paste of the starch with steam at a temperature sufficient to fully disperse or solubilize the starch;

c) conveying and introducing under high temperature and pressure the jet-cooked dispersion or solution into a nozzle of the spray-dryer;

d) atomizing the jet-cooked dispersion or solution through the nozzle of the spray-dryer;

e) drying the atomized mist of the jet-cooked starch within the spray-dryer chamber; and f) recovering the jet-cooked and spray-dried starch as a water dispersible or water soluble powder.

Other useful spray-drying techniques are the steam-injection/dual and single atomization processes as described in U.S. Pat. No. 4,280,851 issued Jul. 28, 1981 to E. Pitchon et al.; U.S. Pat. No. 4,600,472 issued Jul. 15, 1986 to E. Pitchon et al. and U.S. Pat. No. 5,149,799 issued Sep. 22, 1992 to R. Rubens; the disclosures of which are all incorporated herein by reference.

The temperature and pressure conditions used in the spray-drying operation can vary depending on the particular starch material being used and typically the temperature will vary from about 80 to 220° C. and the pressure from about 20 to 150 psig.

Ready for use free aldehyde liquids can be generated from the spray-dried powders by dispersing the powders in water at a pH of about 2 to 9, preferably 5 to 8 and allowing them to dissolve. Concentrations up to 20% or higher can be prepared depending on the fluidity and the acetal content of the base starch.

The starch aldehyde powders of this invention are useful as ready for use wet and dry strength additives in paper-making. The starch aldehyde derivatives may be used as beater additives, although their addition to the pulp may occur at any point in the papermaking process prior to the ultimate conversion of the wet pulp into a dry web or sheet. Thus, for example, they may be added to the pulp while the latter is in the hydropulper, beater, various stock chests or headbox. The derivative may also be sprayed onto the wet web.

The aldehyde derivatives may effectively be used for addition to pulp prepared from any type of cellulosic fibers, synthetic fibers or combinations thereof. Among the cellulosic materials which may by used are bleached and unbleached soda, neutral sulfite, semi-chemical ground wood, ground wood or any combinations of these fibers. Fibers of the viscous rayon or regenerated cellulose type may also be used, if desired.

Any desired inert mineral fillers may be added to the pulp which is to be modified with the starch aldehydes herein. Such materials include clay, titanium dioxide, talc, calcium carbonate, calcium sulfate and diatomaceous earths. Rosin or synthetic internal size may also be present, if desired.

The proportion of the starch aldehyde derivative to be incorporated into the paper pulp may vary in accordance with the particular pulp involved and the properties desired. In general, it is desired to use about 0.05 to 15% and preferably about 0.1 to 5% of the derivative by weight based on the dry weight of the pulp. Within the preferred range, the precise amount which is used will depend upon the type of pulp being used, the specific operating conditions, the particular end use for which the paper is intended and the particular property to be imparted. The use of amounts greater than 5% is not precluded, but is ordinarily unnecessary in order to achieve the desired result.

The following examples will more fully illustrate the embodiments of this invention. In the examples, all parts and percentages are by weight and all temperatures in degrees Celsius unless otherwise noted.

EXAMPLE 1
Preparation of Converted Cationic Starch Acetals by a Consecutive Reaction A native waxy maize starch was first converted using manganese catalyzed hydrogen peroxide oxidation. The starch (5000 g) was slurried in 7500 ml of water and 1333 g of aqueous sodium hydroxide (3%) were introduced slowly to adjust the pH of the mixture to 11.0 to 11.7. Potassium permanganate solution (12.5 g; 2%) was added and allowed to mix for 15 minutes and this was followed by addition of 46.7 g hydrogen peroxide (30% solution). The mixture was stirred at room temperature for 16 h and a sample was taken which was measured to be 65 WF.

Sodium sulfate (2000 g) was added to this slurry of converted starch followed by 357.2 g of 3-chloro-2-hydroxypropyltrimethylammonium chloride (as 65% solution) together with 333.5 g of sodium hydroxide (as 21% solution) simultaneously via mixing through an in-line mixer. The reaction was then allowed to proceed at 40 to 45° C. for 16 h. A small aliquot of the reaction mixture was removed at this stage and analyzed to contain 0.33% cationic nitrogen (DS=0.038).

The pH of the reaction was adjusted to 11.0 to 11.5, if necessary, by adding 4.5% sodium hydroxide solution containing 10% sodium sulfate. An Acetal Reagent, 427.9 g (as 95.6% active) of 2-chloro-N-(2,2-dimethoxyethyl)-N-methylacetamide was then added all at once, and the slurry was stirred at 40 to 45° C. for a further 16 h. The pH of the mixture was maintained during this period between 11.0 to 11.5 using periodic additions of the above-mentioned sodium hydroxide/sodium sulfate solution. The pH of the mixture was then reduced to 8 to 9 using 10% HCl. The product was filtered off, washed extensively with water whose pH was adjusted to 8 to 9, and dried. It was analyzed to contain total nitrogen of 0.75%. Therefore, the nitrogen content due to starch bound acetal reagent was calculated to be 0.42% (DS=0.049).

EXAMPLE 2
Preparation of Cold Water Soluble Cationic Starch Aldehydes by a Two-step Batch Process The fluidity cationic starch acetal prepared in Example 1 above was converted into the free aldehyde form by cooking its 15% solids slurry at pH 2.5 and 90 to 100° C. for 30 minutes followed by rapid cooling. The pH was adjusted with aqueous sulfuric acid. Concentration of the starch dispersion was adjusted to 8 to 10% range by adding appropriate amount of water during the cooling process. The pH of the cooled cationic starch aldehyde dispersion was then slowly raised using aqueous NaOH to 4 to 5 for storage.

The cationic starch aldehyde dispersion prepared above was spray dried using a conventional drier equipped with wheel type atomizer. Inlet and outlet temperatures of the drier were 150 to 220° C. and 80 to 125° C. respectively, and dispersion feed temperature was 75 to 80° C. The resulting product was a cold water soluble cationic starch aldehyde powder, which was stable and easily redispersible for use in papermaking and other applications.

EXAMPLE 3
Preparation of Cold Water Soluble Cationic Starch Aldehydes by a Continuous Jet-cooking Spray-drying Process The converted cationic starch acetals prepared in Example 1 were also converted into cold water soluble cationic starch aldehydes using a process in which a continuous starch jet-cooker was coupled to a spray-drier. In this one-step operation, starch acetals were cooked and hydrolyzed to starch aldehydes simultaneously in the jet-cooking portion of the apparatus followed by being sent immediately to a spray-drier without having been cooled and thus converted to cold water soluble powders in a single continuous manner. A 12% solids slurry of the cationic starch acetal prepared in Example 1, with its pH adjusted to 2.0 with sulfuric acid, was cooked through a steam heated jet-cooker at a rate of 0.25 gpm and at 300 to 310° F. temperature and 60 to 70 psi internal pressure. The resulting cationic starch aldehyde dispersion whose pH was raised to 4 to 5 by in-line addition of aqueous sodium hydroxide, was then sent to a spray-drier equipped with a two-fluid type atomization nozzle without cooling and depressurization. The spray-drying portion of the process was carried out at 460 to 465° F. and 230 to 240° F. inlet and outlet temperatures respectively and a steam atomization pressure of 120 psi, and yielded an easily redispersible, stable and cold water soluble form of the cationic starch aldehyde.

EXAMPLE 4

The cold water soluble cationic starch aldehyde powders prepared in Examples 2 and 3, following dissolution in water were, tested and evaluated for wet tensile strength in 18 lb/3300 sq.ft handsheets made from 100% Northern Softwood Kraft pulp (650 CSF) on a Noble and Wood Sheet Mold. The addition level of the starch was 10 lb/ton. One inch (1") wide strips were cut from the handsheets and tested for wet tensile strength at the breaking point and had an average strength of 293 g/inch and 272 g/inch for powders obtained in Examples 2 and 3 respectively. In comparison, an untreated strip yielded an average of 20 g/inch. Likewise treated strips also showed an enhanced dry strength over untreated strips, giving dry breaking tensile strengths in ranges of 2000 to 2100 g/inch and 1400 to 1500 g/inch respectively. Table 1 summarizes properties and testing results of additional cold water soluble cationic starch aldehydes prepared.

TABLE 1

| Cold water soluble cationic starch aldehyde powders. | | | | |
| --- | --- | --- | --- | --- |
| Sample | Fluidity (WF) | Cationic Substitution (DS) | Acetal Substitution (DS) | Wet strength (g/inch) |
| 1 | 38 | 0.041 | 0.056 | 228 |
| 2 | 44 | 0.038 | 0.061 | 278 |
| 3 | 52 | 0.038 | 0.056 | 271 |
| 4 | 55 | 0.038 | 0.054 | 292 |

TABLE 1-continued

Cold water soluble cationic starch aldehyde powders.

| Sample | Fluidity (WF) | Cationic Substitution (DS) | Acetal Substitution (DS) | Wet strength (g/inch) |
|---|---|---|---|---|
| 5 | 57 | 0.037 | 0.052 | 281 |
| 6 | 58 | 0.037 | 0.054 | 278 |
| 7 | 64 | 0.034 | 0.053 | 292 |
| 8 | 68 | 0.038 | 0.054 | 282 |
| 9 | 73 | 0.037 | 0.052 | 211 |

EXAMPLE 5

To show the stability properties of the cold water soluble cationic starch aldehyde derivatives of this invention, the storage stability of the powder Samples 7 and 9, described in Example 4, were determined at room temperature by comparing the handsheet wet strength tests overtime. The results are summarized in Table 2. The results clearly show the favorable stability properties exhibited by these cold water soluble powders as no significant wet tensile strength reduction took place over an extended period of 4 months to one year.

TABLE 2

Room temperature stability of cold water soluble cationic starch aldehyde powder Samples 7 and 9 described in EXAMPLE 4

| Time (Months) | Sample 7 wet strength (g/inch) | Sample 9 wet strength (g/inch) |
|---|---|---|
| 0 | 292 | 211 |
| 1 | 363 | — |
| 2 | 315 | 277 |
| 3 | 387 | 258 |
| 4 | 330 | 328 |
| 10 | — | 218 |
| 12 | — | 206 |

What is claimed is:

1. A method of preparing a cold water soluble starch aldehyde composition comprising:

a) forming a converted starch acetal having a water fluidity of from about 30 to 85, an acetal content represented by a degree of substitution (DS) of from about 0.005 to 0.25 and a structure selected from the group consisting of:

$$ST-O-CH_2-R-\underset{\underset{R_1}{|}}{\overset{\overset{O}{\|}}{C}}-N-R_2-CH\underset{OA'}{\overset{OA}{<}} \quad (I)$$

$$ST-O-\underset{\underset{R_3}{|}}{\overset{\overset{OH}{|}}{CH}}-\underset{\underset{R_4}{|}}{C}-CH\underset{OA'}{\overset{OA}{<}} \quad (II)$$

$$ST-O-CH_2-\underset{}{\overset{OH}{CH}}-R_5-\underset{\underset{R_7}{|}}{\overset{\overset{R_6}{|}}{N^+}}-R_8-CH\underset{OA'}{\overset{OA}{<}} \cdot Y^-, \text{ and} \quad (III)$$

$$ST-O-R_9-CH\underset{OA'}{\overset{OA}{<}} \quad (IV)$$

wherein ST is starch; R is $(CH_2)_n$ or a divalent aromatic group where n is 0 to 22; $R_1$, $R_6$ and $R_7$ are independently selected from the group consisting of hydrogen and a $C_1$ to $C_{22}$ alkyl, aryl, aralkyl or alkaryl group; $R_2$, $R_5$ and $R_8$ are independently $(CH_2)_m$ where m from 1 to 6, $R_3$ and $R_4$ are independently hydrogen or an alkyl group having 1 to 6 carbon atoms; $R_9$ is a divalent organic group containing no starch-reactive substituents, Y is an anion and A and A' are independently an alkyl group of 1 to 6 carbon atoms or together form at least a 5-membered cyclic acetal;

b) cooking the acetal containing starch under acidic conditions to hydrolyze and form a dispersion of the corresponding starch aldehyde; and c) spray drying the resulting aldehyde at a pH of from about 4 to 7 to form a cold water soluble starch aldehyde powder.

2. The method of claim 1 wherein the starch is modified with a cationic group.

3. The method of claim 2 wherein the spray drying step is a steam-injection dual or single atomization operation.

4. The method of claim 2 wherein the cooking and spray drying steps are combined into a continuous jet cooking/spray drying operation.

5. The method of claim 2 wherein the cationic group is a tertiary amine or quaternary ammonium ether group.

6. The method of claim 1 wherein the starch acetal has a water fluidity of from about 50 to 65 and an acetal content represented by a DS of from about 0.01 to 0.06.

7. The method of claim 6 wherein the starch is modified with a cationic group.

8. The method of claim 7 wherein the spray drying is a steam-injection dual or single atomization operation.

9. The method of claim 7 wherein the cooking and spray drying steps are combined into a continuous jet cooking/spray drying operation.

10. The method of claim 6 wherein the cationic group has a DS of from about 0.005 to 0.25.

11. A cold water starch aldehyde composition comprising a converted starch aldehyde having a water fluidity of from about 30 to 85, an aldehyde content represented by a degree of substitution (DS) of from about 0.005 to 0.25 content and a structure selected from the group consisting of:

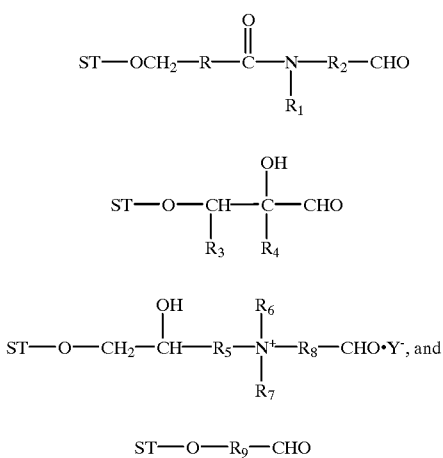

wherein ST is starch or modified starch; R is $(CH_2)_n$ or a divalent aromatic group wherein n is 0 to 22; $R_1$, $R_6$ and $R_7$ are independently selected from the group consisting of hydrogen and a $C_1$ to $C_{22}$ alkyl, aryl, aralkyl or alkaryl group; $R_2$, $R_5$ and $R_8$ are independently $(CH_2)_m$ where m is from 1 to 6; $R_3$ and $R_4$ are independently hydrogen or an alkyl group having 1 to 6 carbon atoms; $R_9$ is a divalent organic group containing no starch-reactive substituents and Y is an anion.

12. The starch aldehyde of claim 11 wherein the starch is selected from the group consisting of corn, potato, sweet potato, wheat, rice, tapioca, waxy maize, sago, sorghum and high amylose starch.

13. The starch aldehyde of claim 12 having a water fluidity of from about 50 to 65 and an aldehyde DS content of from about 0.01 to 0.06.

14. The starch aldehyde of claim 13 wherein the starch is modified with a cationic group which is a tertiary amine or quaternary ammonium ether group.

15. In a method of making paper having wet strength, dry strength and temporary wet strength the step which comprises adding as a strength aid to the stock at any stage prior to forming a web, an effective amount of the cold water soluble starch aldehyde powder of claim 11.

16. The method of claim 15 wherein the starch aldehyde is modified with a cationic group which is a tertiary amine or a quaternary ammonium ether group.

17. The method of claim 15 wherein the starch aldehyde has a water fluidity of from about 50 to 65 and an aldehyde DS content of from about 0.01 to 0.06.

18. The method of claim 17 wherein the starch aldehyde is modified with a cationic group which is a tertiary amine or quaternary ammonium ether group.

* * * * *